(12) United States Patent
Mignogna et al.

(10) Patent No.: US 10,030,082 B2
(45) Date of Patent: Jul. 24, 2018

(54) CATALYST COMPONENTS FOR THE POLYMERIZATION OF OLEFINS

(71) Applicant: BASELL POLIOLEFINE ITALIA S.R.L., Milan (IT)

(72) Inventors: Alessandro Mignogna, Ferrara (IT); Giampiero Morini, Ferrara (IT)

(73) Assignee: Basell Poliolefine Italia S.r.l., Milan (IT)

( * ) Notice: Subject to any disclaimer, the term of this patent is extended or adjusted under 35 U.S.C. 154(b) by 0 days.

(21) Appl. No.: 15/557,014

(22) PCT Filed: Mar. 7, 2016

(86) PCT No.: PCT/EP2016/054773
§ 371 (c)(1),
(2) Date: Sep. 8, 2017

(87) PCT Pub. No.: WO2016/142335
PCT Pub. Date: Sep. 15, 2016

(65) Prior Publication Data
US 2018/0057621 A1    Mar. 1, 2018

(30) Foreign Application Priority Data

Mar. 10, 2015 (EP) ..................... 15158467

(51) Int. Cl.
*C08F 4/649* (2006.01)
*C08F 4/651* (2006.01)
*C08F 4/654* (2006.01)
*C08F 4/655* (2006.01)
*C08F 110/06* (2006.01)

(52) U.S. Cl.
CPC ............ *C08F 110/06* (2013.01); *C08F 4/649* (2013.01); *C08F 4/6495* (2013.01); *C08F 4/6498* (2013.01); *C08F 4/654* (2013.01); *C08F 4/655* (2013.01); *C08F 2410/01* (2013.01)

(58) Field of Classification Search
CPC .... C08F 4/6421; C08F 4/6494; C08F 4/6498; C08F 4/649; C08F 4/6495; C08F 4/654; C08F 4/655; C08F 110/06
See application file for complete search history.

(56) References Cited

U.S. PATENT DOCUMENTS

2008/0194782 A1   8/2008  Uhrhammer et al.
2015/0133289 A1*  5/2015  Mignogna ............... C07C 69/96
                                                        502/127

FOREIGN PATENT DOCUMENTS

DE   19927979 A1   10/2000
EP    2759552 A1    7/2014
EP    2803679 A1   11/2014

* cited by examiner

*Primary Examiner* — Caixia Lu

(57) ABSTRACT

A solid catalyst component for the polymerization of olefins made from or containing Mg, Ti, halogen and an electron donor of formula (I) or (II):

When activated with an aluminum alkyl and optionally an external electron donor, the solid catalyst component can give high activity and stereospecificity in the polymerization of olefins.

15 Claims, No Drawings

CATALYST COMPONENTS FOR THE POLYMERIZATION OF OLEFINS

This application is the U.S. National Phase of PCT International Application PCT/EP2016/054773, filed Mar. 7, 2016, claiming benefit of priority to European Patent Application No. 15158467.9, filed Mar. 10, 2015, the contents of which are incorporated herein by reference in its entirety.

FIELD OF THE INVENTION

In general, the present disclosure relates to the field of chemistry. More specifically, the present disclosure relates to polymer chemistry. In particular, the present disclosure relates to catalyst components for the polymerization of olefins made from or containing a Mg dihalide based support on which are supported Ti atoms and an electron donor compound containing an ester and a carbonate substituent. The present disclosure further relates to the catalysts obtained from the components and to their use in processes for the polymerization of olefins.

BACKGROUND OF THE INVENTION

Concerning the polymerization of propylene, Ziegler-Natta catalysts can be made from or contain a solid catalyst component, constituted by a magnesium dihalide on which are supported a titanium compound and an internal electron donor compound, used in combination with an Al-alkyl compound. When higher crystallinity of the polymer is desired, an external donor can be used to obtain higher isotacticity. Esters of phthalic acid can be used as internal donors in catalyst preparations. The phthalates are used as internal donors in combination with alkylalkoxysilanes as external donor. This catalyst system gives good performances in terms of activity, isotacticity and xylene insolubility.

The use of this catalyst system has raised health concerns with the use of phthalates.

SUMMARY OF THE INVENTION

In a general embodiment, the present disclosure provides a non-diol derivative class of donors containing both a carbonate and an ester function as components in a catalyst for the polymerization of olefins.

In a general embodiment, the present disclosure provides a catalyst component for the polymerization of olefins made from or containing Mg, Ti, halogen and an electron donor of formula (I) or (II)

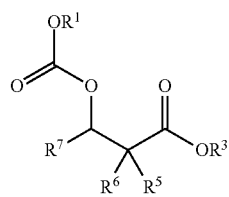

(I)

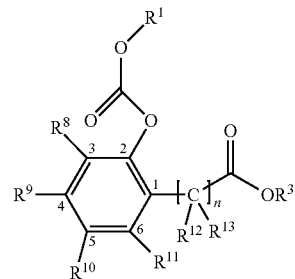

(II)

Where:
- $R^1$ and $R^3$ are selected from $C_1$-$C_{15}$ hydrocarbon groups, optionally containing a heteroatom selected from halogen, P, S, N and O;
- $R^5$-$R^7$ groups are independently hydrogen or a $C_1$-$C_{20}$ hydrocarbon radicals, optionally substituted with heteroatoms selected from halogen, P, S, N, O and Si, which can be fused together to form one or more cycles;
- $R^8$ to $R^{11}$, independently, are selected from hydrogen, halogens or $C_1$-$C_{15}$ hydrocarbon groups optionally substituted with heteroatoms selected from halogen, P, S, N, O and Si;
- $R^{12}$ to $R^{13}$ groups, equal to or different from each other, are hydrogen or $R^1$ groups which can be fused together to form one or more cycles and
- n is an integer from 0 to 2.

DETAILED DESCRIPTION OF THE INVENTION

In some embodiments, structures of formula (I) are those in which at least one of the $R^5$-$R^7$ groups is a $C_1$-$C_{20}$ hydrocarbon radicals, alternatively a $C_1$-$C_{10}$ alkyl group. In some embodiments, $R^5$ and $R^7$ are $C_1$-$C_{10}$ alkyl groups.

In some embodiments, structures of formula (II) are those in which at least one, alternatively at least two, of the $R^8$ to $R^{11}$ groups are different from hydrogen. In some embodiments, structures are those in which the aromatic ring is substituted in position 3, position 5, or both positions. In some embodiments, $R^8$ to $R^{11}$ groups are selected from $C_1$-$C_5$ alkyl groups. In other embodiments, the substitution in position 3, position 5, or both positions is with an alkyl group. In other embodiments, the alkyl group in position 5 is a secondary or tertiary alkyl group. In yet other embodiments, the alkyl group in position 5 is tert-butyl.

In some embodiments, the structures are those in which n is 1, alternatively combined with at least one of $R^{12}$ and $R^{13}$ being hydrogen. In other embodiments, the structures are combined with an aromatic ring substituted as previously described.

In some embodiments, in the structures of formulae (I)-(II), the $R^1$ and $R^3$ groups are independently selected from $C_1$-$C_{15}$ alkyl groups, $C_6$-$C_{14}$ aryl groups, $C_3$-$C_{15}$ cycloalkyl groups, and $C_7$-$C_{15}$ arylalkyl or alkylaryl groups. In other embodiments, the $R^1$ and $R^3$ groups are independently selected from $C_1$-$C_{10}$ alkyl groups and alternatively, from $C_1$-$C_5$ alkyl groups. In some embodiments, one or more of the $R^1$ and $R^3$ groups is ethyl.

In some embodiments, the final amount of electron donor compound in the solid catalyst component ranges from about 1 to about 25% by weight, based upon the total weight of the solid catalyst. In some embodiments, the final amount of electron donor compound in the solid catalyst component ranges from about from about 3 to about 20% by weight, based upon the total weight of the solid catalyst.

In some embodiments, the structures of formulas (I)-(III) are the following:

ethyl 2-((ethoxycarbonyl)oxy)-1-naphthoate, ethyl 2-((ethoxycarbonyl)oxy)-3,5-diisopropylbenzoate, ethyl 2-((ethoxycarbonyl)oxy)-3,5-dimethylbenzoate, ethyl 2-((ethoxycarbonyl)oxy)-3-methylbenzoate, ethyl 2-((ethoxycarbonyl)oxy)benzoate, ethyl 2-((phenoxycarbonyl)oxy)benzoate, ethyl 3,5-di-tert-butyl-2-((ethoxycarbonyl)oxy)benzoate, ethyl 3-((ethoxycarbonyl)oxy)-2-naphthoate, ethyl 5-(tert-butyl)-2-((ethoxycarbonyl)oxy)-3-methylbenzoate, ethyl 5-(tert-butyl)-2-((ethoxycarbonyl)oxy)benzoate, ethyl 5-(tert-butyl)-3-methyl-2-((phenoxycarbonyl)oxy)benzoate, ethyl 5-chloro-2-((ethoxycarbonyl)oxy)benzoate, butyl 2-(2-((ethoxycarbonyl)oxy)phenyl)acetate, butyl 2-(5-(tert-butyl)-2-((ethoxycarbonyl)oxy)-3-methylphenyl)acetate, ethyl 2-(2-((butoxycarbonyl)oxy)phenyl)acetate, ethyl 2-(2-((ethoxycarbonyl)oxy)-3,5-dimethylphenyl)acetate, ethyl 2-(2-((ethoxycarbonyl)oxy)-3-methylphenyl)acetate, ethyl 2-(2-((ethoxycarbonyl)oxy)-5-methylphenyl)acetate, ethyl 2-(2-((ethoxycarbonyl)oxy)naphthalen-1-yl)acetate, ethyl 2-(2-((ethoxycarbonyl)oxy)phenyl)-2-methylpropanoate, ethyl 2-(2-((ethoxycarbonyl)oxy)phenyl)-3,3-dimethylbutanoate, ethyl 2-(2-((ethoxycarbonyl)oxy)phenyl)-3-methylbutanoate, ethyl 2-(2-((ethoxycarbonyl)oxy)phenyl)-3-phenylpropanoate, ethyl 2-(2-((ethoxycarbonyl)oxy)phenyl)-4-methylpentanoate, ethyl 2-(2-((ethoxycarbonyl)oxy)phenyl)acetate, ethyl 2-(2-((ethoxycarbonyl)oxy)phenyl)propanoate, ethyl 2-(2-((isobutoxycarbonyl)oxy)phenyl)acetate, ethyl 2-(2-((methoxycarbonyl)oxy)phenyl)acetate, ethyl 2-(2-((phenoxycarbonyl)oxy)phenyl)acetate, ethyl 2-(2-((propoxycarbonyl)oxy)phenyl)acetate, ethyl 2-(3,5-di-tert-butyl-2-((ethoxycarbonyl)oxy)phenyl)acetate, ethyl 2-(3-((ethoxycarbonyl)oxy)naphthalen-2-yl)acetate, ethyl 2-(5-(tert-butyl)-2-((ethoxycarbonyl)oxy)-3-methylphenyl)-2-methylpropanoate, ethyl 2-(5-(tert-butyl)-2-((ethoxycarbonyl)oxy)-3-methylphenyl)-3-methylbutanoate, ethyl 2-(5-(tert-butyl)-2-((ethoxycarbonyl)oxy)-3-methylphenyl)acetate, ethyl 2-(5-(tert-butyl)-2-((ethoxycarbonyl)oxy)-3-methylphenyl)propanoate, ethyl 2-(5-(tert-butyl)-2-((ethoxycarbonyl)oxy)phenyl)acetate, ethyl 2-(5-(tert-butyl)-3-methyl-2-((phenoxycarbonyl)oxy)phenyl)acetate, ethyl 2-(5-chloro-2-((ethoxycarbonyl)oxy)phenyl)acetate, ethyl 2-(5-methyl-2-((phenoxycarbonyl)oxy)phenyl)acetate, isobutyl 2-(2-((ethoxycarbonyl)oxy)phenyl)acetate, isobutyl 2-(2-((isobutoxycarbonyl)oxy)phenyl)acetate, methyl 2-(2-((ethoxycarbonyl)oxy)phenyl)acetate, methyl 2-(2-((methoxycarbonyl)oxy)phenyl)acetate, propyl 2-(2-((ethoxycarbonyl)oxy)phenyl)acetate, ethyl 2'-((ethoxycarbonyl)oxy)-1,2,3,6-tetrahydro-[1,1'-biphenyl]-2-carboxylate, ethyl 2-(2-((ethoxycarbonyl)oxy)phenyl)-3,6-dimethylcyclohexanecarboxylate, ethyl 2-(2-((ethoxycarbonyl)oxy)phenyl)cyclohexanecarboxylate, ethyl 3-(2-((ethoxycarbonyl)oxy)phenyl)-2-methylbutanoate, ethyl 3-(2-((ethoxycarbonyl)oxy)phenyl)-2-methylpropanoate, ethyl 3-(2-((ethoxycarbonyl)oxy)phenyl)butanoate, ethyl 3-(2-((ethoxycarbonyl)oxy)phenyl)propanoate, ethyl 2,2-dibutyl-3-((ethoxycarbonyl)oxy)-5-methylhexanoate, ethyl 2,2-dibutyl-3-((ethoxycarbonyl)oxy)heptanoate, ethyl 2,2-dibutyl-3-((ethoxycarbonyl)oxy)hexanoate, ethyl 2-(((ethoxycarbonyl)oxy)methyl)-2,4-dimethylpentanoate, ethyl 2-(((ethoxycarbonyl)oxy)methyl)-2-ethyl-4-methylpentanoate, ethyl 2-(((ethoxycarbonyl)oxy)methyl)-2-ethylbutanoate, ethyl 2-(((ethoxycarbonyl)oxy)methyl)-2-ethylhexanoate, ethyl 2-(((ethoxycarbonyl)oxy)methyl)-2-ethylpentanoate, ethyl 2-(((ethoxycarbonyl)oxy)methyl)-2-isobutyl-4-methylpentanoate, ethyl 2-(((ethoxycarbonyl)oxy)methyl)-2-isobutylhexanoate, ethyl 2-(((ethoxycarbonyl)oxy)methyl)-2-methylbutanoate, ethyl 2-(((ethoxycarbonyl)oxy)methyl)-2-methylhexanoate, ethyl 2-(((ethoxycarbonyl)oxy)methyl)-2-methylpentanoate, ethyl 2-(((ethoxycarbonyl)oxy)methyl)-2-propylhexanoate, ethyl 2-(((ethoxycarbonyl)oxy)methyl)-2-propylpentanoate, ethyl 2-(((ethoxycarbonyl)oxy)methyl)-4-methyl-2-propylpentanoate, ethyl 2-(((ethoxycarbonyl)oxy)methyl)-4-methylpentanoate, ethyl 2-(((ethoxycarbonyl)oxy)methyl)butanoate, ethyl 2-(((ethoxycarbonyl)oxy)methyl)hexanoate, ethyl 2-(((ethoxycarbonyl)oxy)methyl)pentanoate, ethyl 2-(1-((ethoxycarbonyl)oxy)ethyl)-2,4-dimethylpentanoate, ethyl 2-(1-((ethoxycarbonyl)oxy)ethyl)-2-ethyl-4-methylpentanoate, ethyl 2-(1-((ethoxycarbonyl)oxy)ethyl)-2-ethylhexanoate, ethyl 2-(1-((ethoxycarbonyl)oxy)ethyl)-2-ethylpentanoate, ethyl 2-(1-((ethoxycarbonyl)oxy)ethyl)-2-isobutyl-4-methylpentanoate, ethyl 2-(1-((ethoxycarbonyl)oxy)ethyl)-2-isobutylhexanoate, ethyl 2-(1-((ethoxycarbonyl)oxy)ethyl)-2-methylhexanoate, ethyl 2-(1-((ethoxycarbonyl)oxy)ethyl)-2-methylpentanoate, ethyl 2-(1-((ethoxycarbonyl)oxy)ethyl)-2-propylhexanoate, ethyl 2-(1-((ethoxycarbonyl)oxy)ethyl)-2-propylpentanoate, ethyl 2-(1-((ethoxycarbonyl)oxy)ethyl)-4-methyl-2-propylpentanoate, ethyl 2-(1-((ethoxycarbonyl)oxy)ethyl)-4-methylpentanoate, ethyl 2-(1-((ethoxycarbonyl)oxy)ethyl)hexanoate, ethyl 2-(1-((ethoxycarbonyl)oxy)ethyl)pentanoate, ethyl 2-(1-((ethoxycarbonyl)oxy)propyl)-2-ethylhexanoate, ethyl 2-(1-((ethoxycarbonyl)oxy)propyl)-2-isobutylhexanoate, ethyl 2-(1-((ethoxycarbonyl)oxy)propyl)-2-methylhexanoate, ethyl 2-(1-((ethoxycarbonyl)oxy)propyl)-2-propylhexanoate, ethyl 2-(1-((ethoxycarbonyl)oxy)propyl)hexanoate, ethyl 2-butyl-2-(((ethoxycarbonyl)oxy)methyl)hexanoate, ethyl 2-butyl-2-(1-((ethoxycarbonyl)oxy)ethyl)hexanoate, ethyl 2-butyl-2-(1-((ethoxycarbonyl)oxy)propyl)hexanoate, ethyl 2-butyl-3-((ethoxycarbonyl)oxy)-2,5-dimethylhexanoate, ethyl 2-butyl-3-((ethoxycarbonyl)oxy)-2-ethyl-5-methylhexanoate, ethyl 2-butyl-3-((ethoxycarbonyl)oxy)-2-ethylheptanoate, ethyl 2-butyl-3-((ethoxycarbonyl)oxy)-2-ethylhexanoate, ethyl 2-butyl-3-((ethoxycarbonyl)oxy)-2-isobutyl-5-methylhexanoate, ethyl 2-butyl-3-((ethoxycarbonyl)oxy)-2-isobutylheptanoate, ethyl 2-butyl-3-((ethoxycarbonyl)oxy)-2-isobutylhexanoate, ethyl 2-butyl-3-((ethoxycarbonyl)oxy)-2-methylheptanoate, ethyl 2-butyl-3-((ethoxycarbonyl)oxy)-2-methylhexanoate, ethyl 2-butyl-3-((ethoxycarbonyl)oxy)-2-propylheptanoate, ethyl 2-butyl-3-((ethoxycarbonyl)oxy)-2-propylhexanoate, ethyl 2-butyl-3-((ethoxycarbonyl)oxy)-5-methyl-2-propylhexanoate, ethyl 2-butyl-3-((ethoxycarbonyl)oxy)-5-methylhexanoate, ethyl 2-butyl-3-((ethoxycarbonyl)oxy)heptanoate, ethyl 2-butyl-3-((ethoxycarbonyl)oxy)hexanoate, ethyl 3-((ethoxycarbonyl)oxy)-2,2,5-trimethylhexanoate, ethyl 3-((ethoxycarbonyl)oxy)-2,2-diethyl-5-methylhexanoate, ethyl 3-((ethoxycarbonyl)oxy)-2,2-diethylbutanoate, ethyl 3-((ethoxycarbonyl)oxy)-2,2-diethylheptanoate, ethyl 3-((ethoxycarbonyl)oxy)-2,2-diethylhexanoate, ethyl 3-((ethoxycarbonyl)oxy)-2,2-diethylpentanoate, ethyl 3-((ethoxycarbonyl)oxy)-2,2-diisobutyl-5-methylhexanoate, ethyl 3-((ethoxycarbonyl)oxy)-2,2-diisobutylheptanoate, ethyl 3-((ethoxycarbonyl)oxy)-2,2-diisobutylhexanoate, ethyl 3-((ethoxycarbonyl)oxy)-2,2-diisobutylpentanoate, ethyl 3-((ethoxycarbonyl)oxy)-2,2-dimethylbutanoate, ethyl 3-((ethoxycarbonyl)oxy)-2,2-dimethylheptanoate, ethyl 3-((ethoxycarbonyl)oxy)-2,2-dimethylhexanoate, ethyl 3-((ethoxycarbonyl)oxy)-2,2-dimethylpentanoate, ethyl 3-((ethoxycarbonyl)oxy)-2,2-dimethylpropanoate, ethyl 3-((ethoxycarbonyl)oxy)-2,2-dipropylheptanoate, ethyl 3-((ethoxycarbonyl)oxy)-2,2-dipropylhexanoate, ethyl 3-((ethoxycarbonyl)oxy)-2,2-dipropylpentanoate, ethyl 3-((ethoxycarbonyl)oxy)-2,5-dimethyl-2-propylhexanoate, ethyl 3-((ethoxycarbonyl)oxy)-2,5-dimethylhexanoate, ethyl 3-((ethoxycarbonyl)oxy)-2-ethyl-2,5-dimethylhexanoate, ethyl 3-((ethoxycarbonyl)oxy)-2-ethyl-2-isobutyl-5-methylhexanoate, ethyl 3-((ethoxycarbonyl)oxy)-2-ethyl-2-isobutylheptanoate, ethyl 3-((ethoxycarbonyl)oxy)-2-ethyl-2-isobutylhexanoate, ethyl 3-((ethoxycarbonyl)oxy)-2-ethyl-2-isobutylpentanoate, ethyl 3-((ethoxycarbonyl)oxy)-2-ethyl-2-methylbutanoate, ethyl 3-((ethoxycarbonyl)oxy)-2-ethyl-2-methylheptanoate, ethyl 3-((ethoxycarbonyl)oxy)-2-ethyl-2-methylhexanoate, ethyl 3-((ethoxycarbonyl)oxy)-2-ethyl-2-methylpentanoate, ethyl 3-((ethoxycarbonyl)oxy)-2-ethyl-2-propylheptanoate, ethyl 3-((ethoxycarbonyl)oxy)-2-ethyl-2-propylhexanoate, ethyl 3-((ethoxycarbonyl)oxy)-2-ethyl-2-propylpentanoate, ethyl 3-((ethoxycarbonyl)oxy)-2-ethyl-5-methyl-2-propylhexanoate, ethyl 3-((ethoxycarbonyl)oxy)-2-ethyl-5-methylhexanoate, ethyl 3-((ethoxycarbonyl)oxy)-2-ethylbutanoate, ethyl 3-((ethoxycarbonyl)oxy)-2-ethylheptanoate, ethyl 3-((ethoxycarbonyl)oxy)-2-ethylhexanoate, ethyl 3-((ethoxycarbonyl)oxy)-2-ethylpentanoate, ethyl 3-((ethoxycarbonyl)oxy)-2-isobutyl-2,5-dimethylhexanoate, ethyl 3-((ethoxycarbonyl)oxy)-2-isobutyl-2-methylheptanoate, ethyl 3-((ethoxycarbonyl)oxy)-2-isobutyl-2-methylhexanoate, ethyl 3-((ethoxycarbonyl)oxy)-2-isobutyl-2-methylpentanoate, ethyl 3-((ethoxycarbonyl)oxy)-2-isobutyl-2-propylheptanoate, ethyl 3-((ethoxycarbonyl)oxy)-2-isobutyl-2-propylhexanoate, ethyl 3-((ethoxycarbonyl)oxy)-2-isobutyl-2-propylpentanoate, ethyl 3-((ethoxycarbonyl)oxy)-2-isobutyl-5-methyl-2-propylhexanoate, ethyl 3-((ethoxycarbonyl)oxy)-2-isobutyl-5-methylhexanoate, ethyl 3-((ethoxycarbonyl)oxy)-2-isobutylheptanoate, ethyl 3-((ethoxycarbonyl)oxy)-2-isobutylhexanoate, ethyl 3-((ethoxycarbonyl)oxy)-2-isobutylpentanoate, ethyl 3-((ethoxycarbonyl)oxy)-2-methyl-2-propylheptanoate, ethyl 3-((ethoxycarbonyl)oxy)-2-methyl-2-propylhexanoate, ethyl 3-((ethoxycarbonyl)oxy)-2-methyl-2-propylpentanoate, ethyl 3-((ethoxycarbonyl)oxy)-2-methylbutanoate, ethyl 3-((ethoxycarbonyl)oxy)-2-methylheptanoate, ethyl 3-((ethoxycarbonyl)oxy)-2-methylhexanoate, ethyl 3-((ethoxycarbonyl)oxy)-2-methylpentanoate, ethyl 3-((ethoxycarbonyl)oxy)-2-methylpropanoate, ethyl 3-((ethoxycarbonyl)oxy)-2-propylheptanoate, ethyl 3-((ethoxycarbonyl)oxy)-2-propylhexanoate, ethyl 3-((ethoxycarbonyl)oxy)-2-propylpentanoate, ethyl 3-((ethoxycarbonyl)oxy)-5-methyl-2,2-dipropylhexanoate, ethyl 3-((ethoxycarbonyl)oxy)-5-methyl-2-propylhexanoate, ethyl 3-((ethoxycarbonyl)oxy)-5-methyl hexanoate, ethyl 3-((ethoxycarbonyl)oxy)butanoate, ethyl 3-((ethoxycarbonyl)oxy)heptanoate, ethyl 3-((ethoxycarbonyl)oxy) hexanoate, ethyl 3-((ethoxycarbonyl)oxy)pentanoate, ethyl 3-((ethoxycarbonyl)oxy)propanoate, . . . ethyl 4-((ethoxycarbonyl)oxy)-2,2-dimethylpentanoate, ethyl 4-((ethoxycarbonyl)oxy)-2,3-dimethylpentanoate, ethyl 4-((ethoxycarbonyl)oxy)-2-methylbutanoate, ethyl 4-((ethoxycarbonyl)oxy)-2-methylpentanoate, ethyl 4-((ethoxycarbonyl)oxy) butanoate, ethyl 4-((ethoxycarbonyl)oxy)pentanoate, ethyl 8-((ethoxycarbonyl)oxy)-1-naphthoate.

In some embodiments, the compounds falling in formula (I) can be prepared by reacting a hydroester HO-A-COOR$^3$ with an alkyl chloroformate R$^1$O—CO—Cl in the presence of base such as a tertiary amine. In some embodiments, the amount of Ti atoms in the solid catalyst component is higher than 2.5% wt, alternatively higher than 3.0% with respect to the total weight of the catalyst component.

In some embodiments, the catalyst components are made from or contain a titanium compound, having at least a Ti-halogen bond and the electron donor compounds supported on a Mg halide. In some embodiments, the magnesium halide is $MgCl_2$ in active form which is disclosed as a support for Ziegler-Natta catalysts.

In some embodiments, the titanium compounds used in the catalyst component are $TiCl_4$ and $TiCl_3$. In some embodiments, the titanium compounds are Ti-haloalcoholates of formula $Ti(OR)_{m-y}X_y$, where m is the valence of titanium, y is a number between 1 and m−1, X is halogen and R is a hydrocarbon radical having from 1 to 10 carbon atoms.

In some embodiments, the preparation of the solid catalyst component can be carried out according to several methods. One method includes a reaction between magnesium alcoholates or chloroalcoholates and an excess of $TiCl_4$ in the presence of the electron donor compounds at a temperature of about 80 to about 120° C.

In some embodiments, the solid catalyst component is prepared by reacting a titanium compound of formula $Ti(OR)_{m-y}X_y$, where m is the valence of titanium and y is a number between 1 and m, alternatively $TiCl_4$, with a magnesium chloride deriving from an adduct of formula $MgCl_2 \cdot pROH$, where p is a number between 0.1 and 6, alternatively from 2 to 3.5, and R is a hydrocarbon radical having 1-18 carbon atoms. In some embodiments, the adduct is prepared in spherical form by mixing alcohol and magnesium chloride in the presence of an inert hydrocarbon immiscible with the adduct, operating under stirring conditions at the melting temperature of the adduct (100-130° C.). Then, the emulsion is quickly quenched, thereby causing the solidification of the adduct in form of spherical particles. In some embodiments, the resulting adduct is directly reacted with Ti compound. In some embodiments, the resulting adduct is subjected to thermal controlled dealcoholation (80-130° C.) to obtain an adduct in which the number of moles of alcohol is lower than 3, alternatively between 0.1 and 2.5. In some embodiments, the reaction with the Ti compound is carried out by suspending the adduct in cold $TiCl_4$; the mixture is heated up to 80-130° C. and kept at this temperature for 0.5-2 hours. In some embodiments, the adduct is dealcoholated. The treatment with $TiCl_4$ can be carried out one or more times. In some embodiments, the electron donor compound is added during the treatment with $TiCl_4$. In some embodiments, the catalyst components are prepared in spherical form as described in European Patent Application Nos. EP-A-395083, EP-A-553805, EP-A-553806, and EPA601525, or Patent Cooperation Treaty Publication No. WO98/44001, incorporated herein by reference.

In some embodiments, the solid catalyst components show a surface area (by B.E.T. method) between about 20 and about 500 $m^2/g$ and alternatively between about 50 and about 400 $m^2/g$, and a total porosity (by B.E.T. method) higher than about 0.2 $cm^3/g$, alternatively between about 0.2 and about 0.6 $cm^3/g$. The porosity (Hg method) due to pores with radius up to about 10.000 Å may range from about 0.3 to about 1.5 $cm^3/g$, alternatively from about 0.45 to about 1 $cm^3/g$.

In some embodiments, the solid catalyst component has an average particle size ranging from about 5 to about 120 μm, alternatively from about 10 to about 100 μm.

In some embodiments, the desired electron donor compounds can be added or, alternatively, obtained in situ by using an appropriate precursor capable to be transformed in the electron donor compound. In some embodiments, the in situ process can be achieved by chemical reactions such as transterification.

In some embodiments, the final amount of the electron donor compound of formula (I) is such that its molar ratio with respect to the Ti atoms is from about 0.01 to about 2, alternatively from about 0.05 to about 1.5.

In some embodiments, the solid catalyst components are converted into catalysts for the polymerization of olefins by reacting the solid catalyst components with organoaluminum compounds.

In some embodiments, the present disclosure provides a catalyst for the polymerization of olefins $CH_2=CHR$, in which R is hydrogen or a hydrocarbyl radical with 1-12 carbon atoms, made from or containing a product obtained by contacting:
(i) the solid catalyst component and
(ii) an alkylaluminum compound and optionally,
(iii) an external electron donor compound.

In some embodiments, the alkyl-Al compound (ii) is chosen among trialkyl aluminum compounds, including, for example, triethylaluminum, triisobutylaluminum, tri-n-butylaluminum, tri-n-hexylaluminum, and tri-n-octylaluminum. In some embodiments, the alkyl-Al compound is selected from the group consisting of alkylaluminum halides, alkylaluminum hydrides or alkylaluminum sesquichlorides. In some embodiments, the alkyl-Al compound is selected from the group consisting of $AlEt_2Cl$ and $Al_2Et_3Cl_3$. In some embodiments, the alkyl-Al compound is a mixture including trialkylaluminums.

In some embodiments, the external electron-donor compounds include silicon compounds, ethers, esters, amines, heterocyclic compounds and ketones. In some embodiments, the external electron-donor compound is 2,2,6,6-tetramethylpiperidine In some embodiments, the external donor compounds are silicon compounds of formula $(R_7)_a(R_8)_bSi(OR_9)_c$, where a and b are integers from 0 to 2, c is an integer from 1 to 4 and the sum (a+b+c) is 4; $R_7$, $R_8$, and $R_9$, are radicals with 1-18 carbon atoms optionally containing heteroatoms. In some embodiments, the silicon compounds have a is 1, b is 1, c is 2, at least one of $R_7$ and $R_8$ is selected from branched alkyl, cycloalkyl or aryl groups with 3-10 carbon atoms optionally containing heteroatoms and $R_9$ is a $C_1$-$C_{10}$ alkyl group. In some embodiments, the $R_9$ is a methyl group. In some embodiments, the silicon compounds are selected from the group consisting of methylcyclohexyldimethoxysilane (C donor), diphenyldimethoxysilane, methyl-t-butyldimethoxysilane, dicyclopentyldimethoxysilane (D donor), diisopropyldimethoxysilane, (2-ethylpiperidinyl)t-butyldimethoxysilane, (2-ethylpiperidinyl)thexyldimethoxysilane, (3,3,3-trifluoro-n-propyl)(2-ethylpiperidinyl)dimethoxysilane, methyl(3,3,3-trifluoro-n-propyl)dimethoxysilane, and N,N-diethylaminotriethoxysilane. In other embodiments, the silicon compounds have a is 0, c is 3, $R_8$ is a branched alkyl or cycloalkyl group, optionally containing heteroatoms, and $R_9$ is methyl. In some embodiments, the silicon compounds are selected from the group consisting of cyclohexyltrimethoxysilane, t-butyltrimethoxysilane and thexyltrimethoxysilane.

In some embodiments, the electron donor compound (iii) is used in an amount to give a molar ratio between the organoaluminum compound and the electron donor compound (iii) of from about 0.1 to about 500, alternatively from about 1 to about 300 and alternatively from about 3 to about 100.

In some embodiments, the present disclosure provides a process for the polymerization or copolymerization of olefins $CH_2=CHR$, in which R is hydrogen or a hydrocarbyl radical with 1-12 carbon atoms, carried out in the presence of a catalyst made from or containing a product of the reaction between:
(i) the solid catalyst component;
(ii) an alkylaluminum compound and,
(iii) optionally an electron-donor compound (external donor).

In some embodiments, the polymerization process is carried out in slurry polymerization using, as diluent, an inert hydrocarbon solvent, or bulk polymerization using the liquid monomer as a reaction medium. In some embodiment, the liquid monomer is propylene. In some embodiments, the polymerization process occurs in gas-phase operating in one or more fluidized or mechanically agitated bed reactors.

In some embodiments, the polymerization may be carried out at temperature of from about 20 to about 120° C., alternatively of from about 40 to about 80° C. When the polymerization is carried out in gas-phase, the operating pressure may range between about 0.5 and about 5 MPa, alternatively between about 1 and about 4 MPa. In the bulk polymerization the operating pressure may range between about 1 and about 8 MPa, alternatively between about 1.5 and about 5 MPa.

The following examples are given in order to further illustrate the subject matter of the present disclosure without being intended as limiting it.

Characterizations

Determination of X.I.

In a round-bottomed flask provided with a cooler and a reflux condenser, 2.5 g of polymer and 250 ml of o-xylene were placed and kept under nitrogen. The mixture was heated to 135° C. and kept under stirring for about 60 minutes. The final solution was allowed to cool to 25° C. under continuous stirring, and the insoluble polymer was then filtered. The filtrate was then evaporated in a nitrogen flow at 140° C. to reach a constant weight. The content of the xylene-soluble fraction was expressed as a percentage of the original 2.5 grams and then, by difference, the X.I. %.

Determination of Donors

The content of electron donor was determined by gas-chromatography. The solid component was dissolved in acidic water. The solution was extracted with ethyl acetate, an internal standard was added, and a sample of the organic phase was analyzed in a gas chromatograph, to determine the amount of donor present at the starting catalyst compound.

Melt Flow Rate (MFR)

The melt flow rate MIL of the polymer was determined according to ISO 1133 (230° C., 2.16 Kg).

EXAMPLES

General Procedure for Preparation of the Spherical Adducts

An initial amount of microspheroidal $MgCl_2.2.8C_2H_5OH$ was prepared according to the method described in Example 2 of Patent Cooperation Treaty Publication No. WO98/44009, incorporated herein by reference but operating on larger scale.

General Procedure for the Preparation of the Solid Catalyst Component

Into a 500 mL round bottom flask, equipped with mechanical stirrer, cooler and thermometer, 250 mL of $TiCl_4$ were introduced at room temperature under nitrogen atmosphere. After cooling to 0° C., while stirring, the internal donor and 10.0 g of the spherical adduct were sequentially added into the flask. The charged internal donor was in an amount sufficient to charge a Mg/donor molar ratio of 6. The temperature was raised to 100° C. and maintained for 2 hours. Thereafter, stirring was stopped, the solid product was allowed to settle and the supernatant liquid was siphoned off at 100° C. After the supernatant was removed, additional fresh $TiCl_4$ was added to reach the initial liquid volume again. The mixture was then heated at 120° C. and kept at this temperature for 1 hour. Stirring was stopped again. The solid was allowed to settle. The supernatant liquid was siphoned off.

The solid was washed with anhydrous hexane six times (6×100 mL) in temperature gradient down to 60° C. and one time (100 mL) at room temperature. The solid was then dried under vacuum and analyzed.

General Procedure for the Polymerization of Propylene

A 4 liter steel autoclave equipped with a stirrer, pressure gauge, thermometer, catalyst feeding system, monomer feeding lines and thermostating jacket, was purged with nitrogen flow at 70° C. for one hour. Then, at 30° C. under propylene flow, the autoclave was charged in sequence with 75 mL of anhydrous hexane, 0.76 g of $AlEt_3$, dicyclopentyldimethoxysilane in an amount sufficient to have a Al/Si molar ratio of 20, and 0.006÷0.010 g of solid catalyst component. The autoclave was closed; subsequently 2.0 NL of hydrogen were added. Then, under stirring, 1.2 kg of liquid propylene was fed. The temperature was raised to 70° C. in five minutes and the polymerization was carried out at this temperature for two hours. At the end of the polymerization, the non-reacted propylene was removed; the polymer was recovered and dried at 70° C. under vacuum for three hours. Then the polymer was weighed and fractionated with o-xylene to determine the amount of the xylene insoluble (X.I.) fraction.

Donor Synthesis

Synthesis of Donor of Example 1

In a 250 mL round bottom flask, under nitrogen at room temperature, the following components were introduced: ethyl 2-hydroxy-3,5-diisopropylbenzoate (10 g, 40 mmol), $CH_2Cl_2$ (60 mL), and pyridine (3.5 mL, 44 mmol). Then, ethyl chloroformate (4.2 mL, 44 mmol) was added dropwise under stirring and cooling. The mixture was stirred at room temperature until GC showed the starting components were completely converted into product. The mixture was quenched with acidic water. The organic layer was separated and washed with water until neutral pH, then was anhydrified over $Na_2SO_4$. The solvent was distilled off to afford pure ethyl 2-((ethoxycarbonyl)oxy)-3,5-diisopropylbenzoate.

Synthesis of Donor of Example 2

The procedure was the same as that used in the synthetic example 1, except that ethyl 3-hydroxy-2-propylheptanoate was used instead of ethyl 2-hydroxy-3,5-diisopropylbenzoate.

Synthesis of Donor of Example 3

The procedure was the same as that used in the synthetic example 1, except that ethyl 2-(2-hydroxyphenyl)-4-methylpentanoate was used instead of ethyl 2-hydroxy-3,5-diisopropylbenzoate.

Synthesis of donor of Example 4

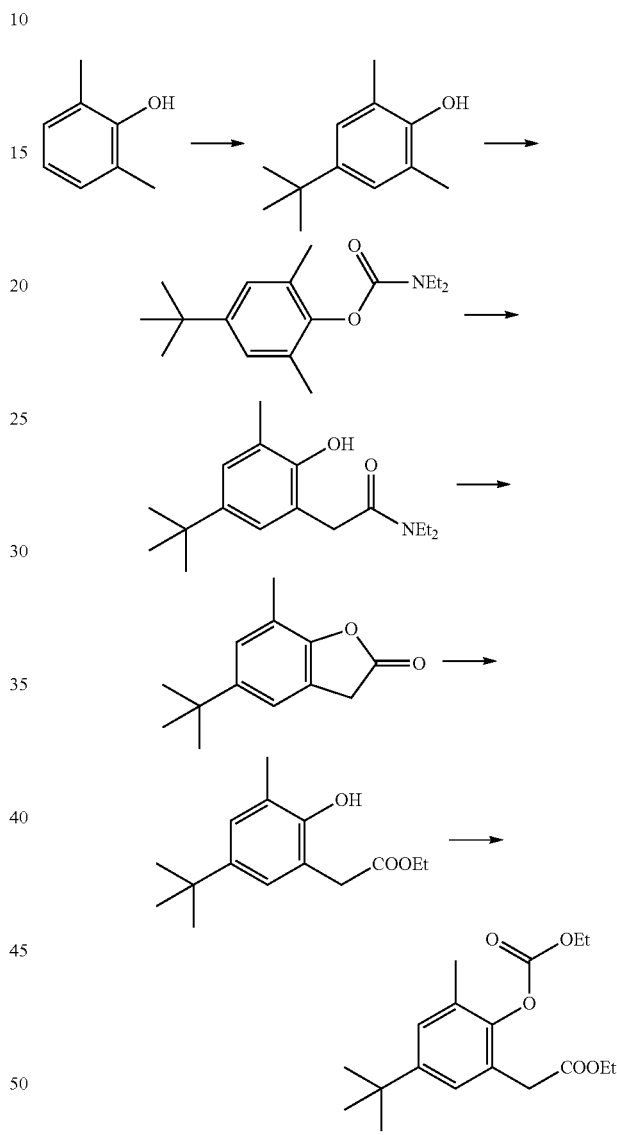

First step: In a 500 mL round bottom flask, under nitrogen at room temperature, the following components were introduced: 2,6-xylenol (54.5 g, 0.45 mol), heptane (130 mL), and tert-butanol (66 g, 0.9 mol). Then, concentrated H2SO4 (28.4 mL, 0.54 mol) was added dropwise under stirring.

After one hour, the reaction was completed. The mixture was diluted with water and diethyl ether. The organic layer was separated and washed with water until neutral pH. Then, the organic layer was anhydrified over Na2SO4. The solvent was distilled off to afford 81.3 g of 4-tert-butyl-2,6-xylenol with a GC purity of 98% wt (yield 98%).

Second step: In a 2-liter round bottom flask and under nitrogen, the following components were introduced: 4-tert-butyl-2,6-xylenol (132.4 g, 0.74 mol), THF (750 mL) and sodium ethoxide (62.9 g, 0.9 mol). After 30 minute of post-reaction time, diethylcarbamoyl chloride (122 mL, 0.97 mol) was added slowly dropwise. The reaction was monitored via GC. Extra sodium ethoxide and diethylcarbamoyl chloride were added to convert completely the starting components. Then the mixture was diluted with water and i-hexanes. The organic layer was separated and washed with water until neutral pH, then anhydrified over Na2SO4. The solvent was distilled off to afford 197.8 g of 4-(tert-butyl)-2,6-dimethylphenyl diethyl carbamate with a GC purity of 98% wt (yield 94%) which solidified upon standing.

Third step: In a 2-liter round bottom flask and under nitrogen, the following components were introduced: THF (770 mL), 4-(tert-butyl)-2,6-dimethylphenyl diethylcarbamate (173.5 g, 0.63 mol) and diisopropylamine (8.8 mL, 0.063 mol). The mixture was cooled to 0° C. and n-BuLi was added dropwise (solution 2.5 mol/L in hexanes, 520 mL, 1.3 mol). Then the cooling bath was removed. The reaction was allowed to warm to room temperature. After 30 minutes at room temperature, the mixture was diluted with water and ethyl acetate. The organic layer was separated and washed with water until neutral pH, then anhydrified over Na2SO4. The solvent was distilled off to afford 177.4 g of 2-(5-(tert-butyl)-2-hydroxy-3-methylphenyl)-N,N-diethylacetamide with a purity GC of 94% (yield 96%).

Fourth step: In a round bottom flask, the following components were introduced: 2-(5-(tert-butyl)-2-hydroxy-3-methylphenyl)-N,N-diethylacetamide (purity 94% from the previous step, 170 g, 0.57 mol), ethanol (200 mL), and concentrated H2SO4 (30.4 mL, 0.57 mol). The mixture was brought to reflux, kept at that temperature for 5 hours, and then diluted with water and ethyl acetate. The organic layer was separated and washed with water until neutral pH and then dried over Na2SO4. The solvent was distilled off to afford a dark oil which is purified via heptane crystallization to afford 86.1 g of 5-(tert-butyl)-7-methylbenzofuran-2(3H)-one with a GC purity of 98% wt (yield 72%).

Fifth step: The 5-(tert-butyl)-7-methylbenzofuran-2(3H)-one (83.4 g, 0.4 mol) was treated with ethanol (200 mL) and a catalytic amount of concentrated H2SO4 at reflux for 30 minutes. Then, the mixture was worked up as to afford ethyl 2-(5-(tert-butyl)-2-hydroxy-3-methylphenyl) acetate.

Sixth step: The procedure was the same as that used in the synthetic example 1, except that ethyl 2-(5-(tert-butyl)-2-hydroxy-3-methylphenyl) acetate was used instead of ethyl 2-hydroxy-3,5-diisopropylbenzoate.

Synthetic of Donor of Example 5

The procedure was the same as that used in the synthetic example 4 except that in the sixth step butyl chloroformate is used instead of ethyl chloroformate.

Examples 1-5

The catalyst components were prepared using the donors indicated in Table 1. The solid catalyst components were analyzed for their composition and tested in polymerization of propylene. The results are listed in Table 1.

TABLE 1

| | Catalyst compostion | | Polymerization | | | |
|---|---|---|---|---|---|---|
| | Internal Donor | | Ti | Mileage | XI | MIL/ |
| | Name | % wt | % wt | kg/g | % wt | 10' |
| 1 | [structure: 2,4-diisopropylphenyl ethyl carbonate with COOEt substituent] | 12.0 | 4.3 | 44 | 96.5 | 6.9 |
| 2 | [structure: alkyl carbonate with COOEt] | 9.2 | 3.9 | 39.4 | 96.3 | 5.5 |

TABLE 1-continued

| | Catalyst compostion | | Polymerization | | | |
|---|---|---|---|---|---|---|
| | Internal Donor | | Ti | Mileage | XI | MIL/ |
| | Name | % wt | % wt | kg/g | % wt | 10' |
| 3 | (structure) | n.d. | 3.6 | 28.6 | 97.5 | 5.5 |
| 4 | (structure) | 16.9 | 3.0 | 30.0 | 98.3 | 5.1 |
| 5 | (structure) | 16.2 | 3.1 | 30.5 | 98.1 | 2.9 | n.d.: not determined

What is claimed is:

1. A solid catalyst component for the polymerization of olefins comprising:
(i) Mg,
(ii) Ti,
(iii) halogen,
(iv) and an electron donor of formula (I) or (II)

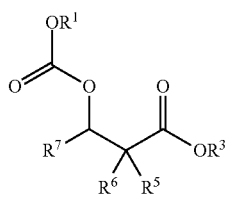

(I)

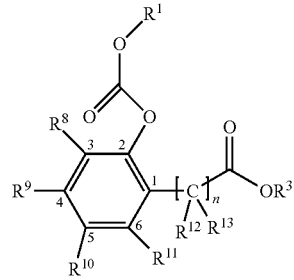

(II)

where:
$R^1$ and $R^3$ are selected from $C_1$-$C_{15}$ hydrocarbon groups, optionally containing a heteroatom selected from the group consisting of halogens, P, S, N and O;
$R^5$-$R^7$ groups are independently hydrogen or a $C_1$-$C_{20}$ hydrocarbon radicals, optionally substituted with heteroatoms selected from the group consisting of halogens, P, S, N, O and Si, which are optionally fused together to form one or more cycles;
$R^8$ to $R^{11}$, independently, are selected from the group consisting of hydrogen, halogens and $C_1$-$C_{15}$ hydrocarbon groups optionally containing heteroatoms selected from the group consisting of halogens, P, S, N, O and Si;
$R^{12}$ to $R^{13}$ groups, which are the same or different from each other, are hydrogen or $R^1$ groups which are optionally fused together to form one or more cycles; and
n is an integer from 0 to 2.

2. The catalyst component according to claim 1, wherein the electron donor of formula (I) has at least one of $R^5$-$R^7$ group as a $C_1$-$C_{20}$ hydrocarbon radical.

3. The catalyst component according to claim 2, wherein at least one of $R^5$-$R^7$ groups is a $C_1$-$C_{10}$ alkyl group.

4. The catalyst component according to claim 3, wherein both $R^5$ and $R^7$ are $C_1$-$C_{10}$ alkyl groups.

5. The catalyst component according to claim 1, wherein at least one of $R^8$ to $R^{11}$ groups is different from hydrogen.

6. The catalyst component according to claim 5, wherein the aromatic ring is substituted in position 3, in position 5, or in both positions with a $C_1$-$C_5$ alkyl group.

7. The catalyst component according to claim 6, wherein the alkyl group in position 5 is a secondary or tertiary alkyl group.

8. The catalyst component according to claim 1, wherein n is 1.

9. The catalyst component according to claim 8, wherein both $R^{12}$ and $R^{13}$ are hydrogen.

10. The catalyst component according to claim 1, wherein $R^1$ and $R^3$ groups are independently selected from the group consisting of $C_1$-$C_{15}$ alkyl groups, $C_6$-$C_{14}$ aryl groups, $C_3$-$C_{15}$ cycloalkyl groups, and $C_7$-$C_{15}$ arylalkyl or alkylaryl groups.

11. The catalyst component according to claim 10, wherein $R^1$ and $R^3$ groups are independently selected from the group consisting of $C_1$-$C_5$ alkyl groups.

12. The catalyst component according to claim 11, wherein $R^1$ and $R^3$ groups are ethyl.

13. A catalyst for the polymerization of olefins comprising:
(a) a product of a reaction between:
(i) a solid catalyst component comprising:
(A) Mg,
(B) TI,
(C) halogen, and
(D) an electron donor of formula (I) or (II)

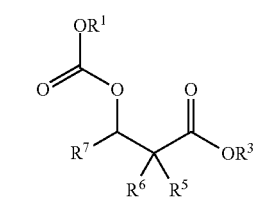

(I)

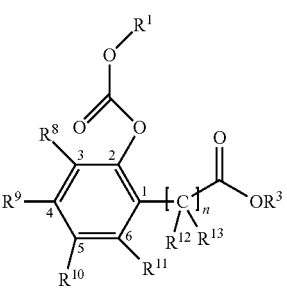

(II)

where:
$R^1$ and $R^3$ are selected from $C_1$-$C_{15}$ hydrocarbon groups, optionally containing a heteroatom selected from the group consisting of halogens, P, S, N and O;
$R^5$-$R^7$ groups are independently hydrogen or a $C_1$-$C_{20}$ hydrocarbon radicals, optionally containing heteroatoms selected from the group consisting of halogens, P, S, N, O and Si, and are optionally fused together to form one or more cycles;
$R^8$ to $R^{11}$, independently, are selected from the group consisting of hydrogen, halogens and $C_1$-$C_{15}$ hydrocarbon groups optionally containing heteroatoms selected from the group consisting of halogens, P, S, N, O and Si;
$R^{12}$ to $R^{13}$ groups, which are the same or different from each other, are hydrogen or $R^1$ groups which are optionally fused together to form one or more cycles and
n is an integer from 0 to 2;
(ii) an alkylaluminum compound and optionally,
(iii) an external electron donor compound.

14. The catalyst according to claim 13 further comprising an external electron donor compound.

15. A process for the polymerization or copolymerization of an olefins comprising:
(a) polymerizing an olefin $CH_2$=CHR, wherein R is hydrogen or a hydrocarbyl radical with 1-12 carbon atoms, in the presence of a catalyst system comprising:
(A) a product of a reaction between:
i. a solid catalyst component comprising:
(1) Mg,
(2) Ti,
(3) halogen, and
(4) an electron donor of formula (I) or (II)

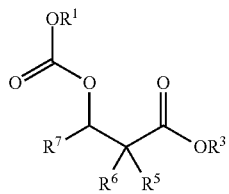

(I)

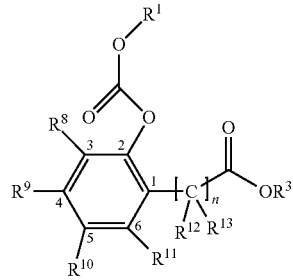

(II)

where:
$R^1$ and $R^3$ are selected from $C_1$-$C_{15}$ hydrocarbon groups, optionally containing a heteroatom selected from the group consisting of halogens, P, S, N and O;
$R^5$-$R^7$ groups are independently hydrogen or a $C_1$-$C_{20}$ hydrocarbon radicals, optionally containing heteroatoms selected from the group consisting of halogens, P, S, N, O and Si, and are optionally fused together to form one or more cycles;
$R^8$ to $R^{11}$, independently, are selected from the group consisting of hydrogen, halogens and $C_1$-$C_{15}$ hydrocarbon groups optionally substituted with heteroatoms selected from the group consisting of halogens, P, S, N, O and Si;
$R^{12}$ to $R^{13}$ groups, which are the same or different from each other, are hydrogen or $R^1$ groups which are optionally fused together to form one or more cycles and
n is an integer from 0 to 2;
ii. an alkylaluminum compound; and
iii. optionally an external donor compound.

* * * * *